United States Patent [19]

Momont et al.

[11] Patent Number: 5,641,413
[45] Date of Patent: Jun. 24, 1997

[54] REMOVAL OF NITROGEN FROM WASTEWATERS

[75] Inventors: Joseph A. Momont, Mosinee; William M. Copa, Schofield, both of Wis.

[73] Assignee: Zimpro Environmental, Inc., Rothschild, Wis.

[21] Appl. No.: 548,921

[22] Filed: Oct. 27, 1995

[51] Int. Cl.$^6$ ..................................... C02F 1/72
[52] U.S. Cl. ........................... 210/761; 210/762; 210/763
[58] Field of Search ................................. 210/763, 761, 210/762

[56] References Cited

U.S. PATENT DOCUMENTS

| | | | |
|---|---|---|---|
| 4,654,194 | 3/1987 | Harada et al. | 210/763 |
| 5,118,447 | 6/1992 | Cox et al. | 252/626 |
| 5,221,486 | 6/1993 | Fassbender | 210/757 |

FOREIGN PATENT DOCUMENTS

| | | |
|---|---|---|
| 3740536 | 3/1978 | Germany . |
| 61-257291 | 11/1986 | Japan . |
| 61-257292 | 11/1986 | Japan . |
| 4059094 | 2/1992 | Japan . |
| 4061987 | 2/1992 | Japan . |
| 4200692 | 7/1992 | Japan . |
| 1375259 | 11/1974 | United Kingdom . |

OTHER PUBLICATIONS

Leavitt, D.D. et al., "Homogeneously Catalyzed Oxidation for the Destruction of Aqueous Organic Wastes", *Environmental Progress* (vol. 9, No. 4), pp. 222–228; Nov. 1990.
Leavitt, D.D. et al., "Acid–Catalyzed Oxidation of 2, 4–Dichlorophenoxyacetic Acid by Ammonium Nitrate in Aqueous Solution.,"*Environ. Sci. Tech.*, 1990, 24, 566–571.

*Primary Examiner*—Neil McCarthy
*Attorney, Agent, or Firm*—Tipton L. Randall

[57] ABSTRACT

A process for treating wastewaters containing carbonaceous COD and at least one nitrogen-containing compound is disclosed comprising wet oxidizing the wastewater with an oxidizing agent at a temperature less than 373° C. and a pressure sufficient to maintain a liquid water phase, to produce an oxidized wastewater containing a reduced concentration of COD. The nitrogen of the nitrogen-containing compound is substantially converted to ammonia, nitrate and nitrite. Sufficient inorganic nitrogen-containing compound is added to the oxidized wastewater to produce essentially equal concentrations of ammonia-nitrogen and nitrite-nitrogen plus nitrate-nitrogen. Mineral acid is added to the oxidized wastewater to produce a pH between 4 and 7, and optionally, a transition metal salt is added, to catalyze a thermal denitrification step. The wastewater is heated at temperatures between about 100° C. and 300° C. to decompose the nitrogen compounds, producing a purified wastewater.

14 Claims, No Drawings

REMOVAL OF NITROGEN FROM WASTEWATERS

FIELD OF THE INVENTION

The present invention relates to a process for removing both carbonaceous pollutants and nitrogen from wastewaters, and more particularly to a catalytic process for the removal of ammonia nitrogen and nitrate-nitrogen or nitrite-nitrogen.

BACKGROUND OF THE INVENTION

Nitrogen-containing water pollutants may be organo-nitrogen compounds or inorganic nitrogen-containing salts, particularly ammonium salts and nitrate or nitrite salts. Often these two types of pollutants are found together in a wastewater. The removal of these substances from wastewaters poses a formidable treatment task.

The toxic characteristics of many of these nitrogen-containing substances makes biological treatment impossible or impractical due to the large dilution factors required to allow some form of biological treatment. Various so-called advanced oxidation processes, such as ozone, peroxide or UV treatment, alone or in combination, may be ineffective for all the nitrogen-containing compounds in a particular waste. Multiple treatment steps may be employed but this is a costly alternative which can be avoided.

The Stamicarbon B.V. patent, GB 1,375,259 discloses the decomposition of ammonium nitrate solutions at elevated temperatures and pressures. The examples given are for the treatment of a caprolactam waste with ammonium nitrate as the oxidation agent with or without air present. The treatments were performed at 250° C. to 300° C. and showed excellent removal of COD from the waste. Another example described treatment of sludge containing a Chemical Oxygen Demand (COD) of 20.7 g/l with 100 g/l ammonium nitrate at 300° C. for 2 hours to give 80% COD removal. Nitric acid was also used as the oxidizing agent in autoclave experiments.

German patent application 2740536 by Ciba-Geigy describes a two step process for wastewater treatment. In the first step wet oxidation converts nitrogen-containing compounds to ammonia, and in the second step a solution of sodium nitrite is added to the ammonia-containing wastewater to decompose the ammonia therein according to the equation:

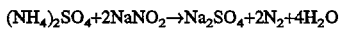

$(NH_4)_2SO_4 + 2NaNO_2 \rightarrow Na_2SO_4 + 2N_2 + 4H_2O$

Harada et al. in U.S. Pat. No. 4,654,194 disclose the use of a noble metal catalyst supported on a titania carrier to decompose ammonium nitrate in solution. Examples were carried out a 250° C. for 60 minutes to give 50–99% decomposition of both ammonium nitrate and nitrite without air present. Further examples are given where an organic (phenol) was added with 0.2 times the required amount of oxygen. Decomposition of both ammonium nitrate and phenol was found.

Osaka Gas Co. has filed a number of Japanese patents concerning decomposition of ammonium nitrate wastewaters. One group, JP 61 257,292 and JP 61 257,291, disclose wet oxidation of ammonium nitrate wastewaters with 1.0 to 1.5 times the stoichiometric oxygen required for ammonia decomposition, at pH 3–11.5 at 100°–370° C. with a supported noble metal catalyst. Another group, JP 4,059,094, JP 4,061,987 and JP 4,200,692, disclose adding organic substances to an ammonium nitrate wastewater and pyrolysis of the mixture at 100°–370° C. in the absence of oxygen with a supported noble metal catalyst, then wet oxidizing the effluent at similar conditions with oxygen-containing gas.

Cox et al. in U.S. Pat. No. 5,118,447 disclose a process for thermochemical nitrate destruction where an aqueous solution of nitrate or nitrite is contacted with a stoichiometric amount of formic acid or formate salt, depending upon pH. The mixture is heated to 200° C. to 600° C. in the liquid phase to form elemental nitrogen and carbon dioxide. The reaction may be carried out over the pH range of 0–14.

Fassbender, in U.S. Pat. No. 5,221,486, discloses another denitrification process where the types of nitrogen compounds present in a waste stream are identified and quantitated. The oxidized and reduced forms of nitrogen are balanced by adding an appropriate nitrogen containing reactant such as ammonia or a nitrite or nitrate compound, and then the mixture is heated to 300° to 600° C. under pressure to obtain the denitrification reaction.

Wet air oxidation is a well known treatment process for the removal of carbonaceous COD and BOD from wastewaters. High degrees of destruction of toxic and hazardous compounds in wastewaters by wet oxidation are well documented. The process involves contacting a wastewater with an oxygen-containing gas at elevated temperatures and pressures to oxidize pollutants. Temperatures up to the critical temperature of water, 373° C., are employed, with corresponding pressures sufficient to maintain water in the liquid phase. The wet oxidation occurs in the liquid phase without the formation of gaseous oxides of nitrogen or sulfur, as occurs in high temperature gas phase combustion. Most carbonaceous material is converted to carbon dioxide, although some low molecular weight oxygenated species, such as acetic acid, are usually produced. The nitrogen present in organo-nitrogen compounds generally reports as ammonia, nitrate or nitrite in wet oxidation effluent. This liquid often requires additional treatment before discharge to the environment. Applicants have discovered a process which combines wet oxidation of wastewaters at moderate temperatures and pressures, and catalytic decomposition of nitrogen species in the wet oxidation effluent, also at moderate temperatures and pressures, to remove nitrogen and produce a highly treated effluent.

SUMMARY OF THE INVENTION

The invention comprises a process for treating wastewaters containing carbonaceous COD and at least one nitrogen-containing compound comprising the steps of wet oxidizing the wastewater with an oxidizing agent, preferably an oxygen-containing gas, at a temperature less than 373° C. and a pressure sufficient to maintain a liquid water phase, to produce an oxidized wastewater containing a reduced concentration of COD, wherein the nitrogen of the nitrogen-containing compound is substantially converted to ammonia, nitrate and nitrite. Sufficient inorganic nitrogen-containing compound is added to the oxidized wastewater to produce essentially equal concentrations of ammonia-nitrogen and nitrite-nitrogen plus nitrate-nitrogen. Sufficient mineral acid is added to the oxidized wastewater to produce a pH between 4 and 7 to catalyze thermal denitrification. The wastewater is heated at temperatures between about 100° C. and 300° C. to decompose the nitrogen compounds therein to nitrogen gas and water, thereby producing a purified wastewater.

In an alternative embodiment of the invention, sufficient mineral acid is added to the oxidized wastewater to produce a pH between 4 and 7 and an effective amount of a transition metal salt is also added to the treated wastewater to catalyze thermal denitrification. The wastewater is heated at temperatures between about 100° C. and 300° C. to decompose the nitrogen compounds therein to nitrogen gas and water, thereby producing a purified wastewater.

DESCRIPTION OF THE PREFERRED EMBODIMENT

As described above, a wastewater containing carbonaceous COD and nitrogen-containing compounds is treated by wet oxidation to produce an oxidized wastewater containing a reduced concentration of COD. The wet oxidation process operates at temperatures less than 373° C., the critical temperature of water, and with over pressure sufficient to maintain water in the liquid phase. The oxidizing agent, preferably an oxygen-containing gas, used in the process may be air, oxygen-enriched air or essentially pure oxygen. Other oxidizing agents used include hydrogen peroxide or ozone, although these reagents generally are more costly than air or oxygen. In general, temperatures of about 150° C. to 373° C. are necessary in the wet oxidation process to oxidize the carbonaceous COD to carbon dioxide, water and convert the nitrogen portion to ammonia and nitrate or nitrite. Preferably the oxidation temperature is between about 150° C. and 325° C.

Inorganic nitrogen-containing compounds such as cyanides, cyanates or thiocyanates which may be present in the wastewater generally are converted to ammonia under the conditions of the process, while ammonium salts are not oxidized at these conditions. Further, nitrate salts are not decomposed while nitrite salts are stable at basic pH but decompose to oxides of nitrogen at a pH less than 4. The pH of the oxidized effluent can vary greatly depending upon the feed material pH and the waste components present in the feed.

Wastewaters often contain mixtures of organo-nitrogen compounds and other carbonaceous COD along with inorganic salts and other suspended material. Determining the precise composition of the wet oxidation process feed material is often difficult at best. Therefore, after the wet oxidation treatment the oxidized wastewater is analyzed to determine the form and concentration of each nitrogen-containing species present. Wet oxidation converts the pollutants to simpler forms and thus simplifies the analysis of nitrogen-containing species. In general, the nitrogen in the oxidized effluent is present as a combination of ammonia and nitrate or nitrite, depending upon the composition of the feed material.

Sufficient inorganic nitrogen-containing compound is then added to the oxidized effluent such that essentially equal concentrations of ammonia-nitrogen and nitrite-nitrogen plus nitrate-nitrogen are present. The compounds used to add ammonia-nitrogen may include ammonium sulfate, ammonium phosphate or ammonium hydroxide. Alkaline or alkaline earth salts containing nitrate or nitrite, such as potassium nitrate or magnesium nitrite, can be used to add nitrate- or nitrite-nitrogen.

The oxidized wastewater now containing essentially equal concentrations of ammonia-nitrogen and nitrate/nitrite-nitrogen is then acidified to a pH between 4 and 7 with mineral acid, such as sulfuric, phosphoric or nitric acid, provided the wastewater is not already in this pH range. In the case of nitric acid, this material can perform the two-fold function of adding nitrate-nitrogen where required, and producing an acid pH for the oxidized solution.

The resulting acidic solution is heated to or maintained at elevated temperatures for a time sufficient to decompose the nitrogen-containing salts to nitrogen gas and water, producing a purified wastewater containing little or no nitrogen compounds. The elevated temperature employed ranges from about 100° to 300° C. with sufficient over pressure to maintain the wastewater in the liquid phase. This is a much lower temperature and pressure than was reported to be required for the decomposition of these types of ammonium nitrate/nitrite salts. No oxidizing agent, such as air, need be present in this thermal decomposition step, although the presence of an oxidizing agent from the wet oxidation step does not interfere with the decomposition step.

Alternatively, the wet oxidation effluent already may be in the 100° to 300° C. temperature range. Simply providing the required form of nitrogen for balance, adjusting the solution pH to between 4 and 7, and maintaining the effluent temperature in this desired range produces the desired thermal denitrification treatment step. The process of the invention is described as occurring in two stages, a first wet oxidation stage for COD removal and nitrogen conversion and a second nitrogen removal stage where nitrogen form balancing, pH adjustment, and thermal decomposition occur. These two treatment stages may be carried out in separate reaction zones with the effluent cooled between stages. This sequence would be applied to wastewaters with highly variable composition requiring frequent monitoring to maintain the desired ammonia-nitrogen to nitrate- plus nitrite-nitrogen ratio.

In the case where a feed material of constant composition is available for extended periods of treatment, the wet oxidation step and the inorganic nitrogen compound addition, acidification, with ensuing thermal treatment for nitrogen salt decomposition step, may be carried out consecutively in two stages without cool down between the stages, or even within a single treatment stage in one reaction zone. In the case of a vertical bubble column wet oxidation reactor, the wastewater and oxidizing agent, such as an oxygen-containing gas or hydrogen peroxide, can be introduced at the bottom of the reactor with wet oxidation occurring in the lower portion of the reactor. The addition of compounds to balance the nitrogen species, and acid addition are performed in the upper portion of the reactor where the nitrogen removal stage occurs.

As mentioned earlier, nitrite ion is unstable at a pH less than 4, decomposing to oxides of nitrogen. Wet oxidation treatment of nitrogen-containing wastewaters which produce an effluent with a pH less than 4 thus do not contain any nitrite species. Only ammonia and nitrate species will be present in the oxidized solution. In this situation, only ammonia or nitrate species need be added to produce equal amounts of ammonia-nitrogen and nitrate-nitrogen for the thermal denitrification step. Adding nitrite-nitrogen to an oxidized effluent with a pH less than 4 results in the loss of nitrite to gaseous decomposition products. In this situation the acid catalyzed thermal denitrification treatment step is conducted at a pH of 4 or less, without the need to add mineral acid since the oxidized effluent pH is already less than 4.

In an alternative embodiment of the invention, there may be situations where one particular form of nitrogen can be tolerated, or even desired, in the effluent from the process described above. The nitrogen form tolerated may be ammonia-nitrogen or nitrate-nitrogen plus nitrite-nitrogen. In this alternative, the wet oxidation treatment portion of the process, as described above, produces an oxidized wastewater containing a reduced concentration of COD, wherein nitrogen of the nitrogen-containing compound(s) is converted substantially to one or more of ammonia, nitrate and nitrite. The oxidized effluent is analyzed for various forms of nitrogen, and sufficient inorganic nitrogen-containing compound is added to the oxidized wastewater to produce a significant excess concentration of that form of nitrogen which can be tolerated, or is desired, in the effluent. As disclosed above, equal concentrations of ammonia-nitrogen and nitrite- plus nitrate-nitrogen are removed in the thermal denitrification step. In this embodiment sufficient inorganic nitrogen-containing compound is added to the oxidized wastewater to produce a concentration excess of about 1% to 100% of either ammonia-nitrogen or nitrite-nitrogen plus nitrate-nitrogen. The thermal denitrification step then is carried out as described above. Sufficient mineral acid is added to the thus treated oxidized wastewater to produce a pH between 4 and 7, to catalyze thermal denitrification at temperatures between about 100° C. and 300° C. to decompose a portion of the nitrogen compounds therein. The purified wastewater produced contains only nitrogen in that form selected to be in excess concentration prior to the thermal denitrification step. There are situations where one form of nitrogen may be allowed in the effluent from a facility and the above described embodiment of the invention allows for removal of the undesirable forms of nitrogen with the allowable form remaining. Further, it may be desirable to have the remaining effluent nitrogen in a selected form where further treatment of the effluent is expected, such as biological treatment. The selection of the particular form of nitrogen added to the oxidized effluent, the pH adjustment, and other operational variables for this embodiment are the same as those described above.

In a further embodiment of the invention, an effective amount of a soluble transition metal salt is added to the acidified oxidized effluent, adjusted to contain essentially equal concentrations of ammonia-nitrogen and nitrite- plus nitrate-nitrogen, to catalyze the low temperature nitrogen removal process. The transition metal catalyst may be selected from the salts of V, Cr, Mn, Fe, Co, Ni, Cu, Zn, Mo, and Ag. For example, copper salts such as cupric sulfate, cupric nitrate, cupric chloride or cupric bromide may be employed as catalyst. Again, cupric nitrate can both act as a copper catalyst source and provide needed nitrate-nitrogen to balance ammonia-nitrogen concentrations. It may be convenient to add the transition metal salt catalyst dissolved in the mineral acid where addition of both are needed. Alternatively, the soluble transition metal salt may be added to the oxidized effluent as an aqueous solution. In some instances, the soluble transition metal may already be present in the raw wastewater itself.

Alternatively, the transition metal catalyst may be added to, or be present in, the wastewater in an insoluble form, such as a sulfide salt. Wet oxidation treatment of the wastewater oxidizes the insoluble sulfide salt to the soluble sulfate form, thus producing a soluble transition metal salt in the wet oxidation stage effluent.

Another source of transition metal includes complexes such as $Cu^{++}(NH_3)_6X_2^-$ where ammonia-nitrogen can be added to the oxidized wastewater in addition to the transition metal copper. The concentration of soluble transition metal in the oxidized effluent effective in the thermal decomposition step ranges from about 10 mg/l to about 2,000 mg/l. Other transition metal salts effective for the denitrification process include silver nitrate, cobalt sulfate, nickel chloride, zinc sulfate or ferric chloride.

The resulting acidic transition metal containing solution is heated to or maintained at elevated temperatures for a time sufficient to decompose the nitrogen-containing salts to nitrogen gas and water, producing a purified wastewater containing little or no nitrogen compounds. The elevated temperature employed ranges from about 100° to 300° C. with sufficient over pressure to maintain the wastewater in the liquid phase. This is a much lower temperature and pressure than was reported to be required for the decomposition of these types of ammonium nitrate/nitrite salts.

It may be desirable or necessary to remove the soluble transition metal catalyst from the purified wastewater after the thermal denitrification step. Various methods, including chemical precipitation, ion exchange or selective membrane filtration processes, are suitable for this purpose and well known in the art.

The following examples are intended to illustrate the invention, but should not be considered limitations thereof.

EXAMPLE I

A simulated wet oxidation effluent stream at low pH containing acetic acid and equal concentrations of ammonia-nitrogen and nitrate-nitrogen was prepared. It contained 1,000 mg/l acetic acid, and 5,000 mg/l of ammonium nitrate resulting in 875 mg/l each of ammonia-nitrogen and nitrate-nitrogen. The solution was adjusted to a pH of 1.2 with sulfuric acid.

A sample of the solution was placed in an autoclave and pressurized with pure helium to provide sufficient over pressure to maintain water in the liquid phase during heating. This also allowed analysis of the gas phase for elemental nitrogen gas. The autoclave was heated to temperature for 1 hour, then it was cooled and the gas and liquid phases analyzed with the results shown in Table 1.

At 260° C. a portion of the solution nitrogen is converted to elemental nitrogen. As the reaction temperature increases, a significant amount of solution nitrogen is converted to elemental nitrogen gas. Likewise, as reaction temperature increases, the Chemical Oxygen Demand (COD) of the liquid is reduced, indicating destruction of acetic acid by the decomposition reaction. Total Kjeldahl Nitrogen (TKN) measures ammonia-nitrogen but not nitrate-nitrogen, and liquid TKN values mirror ammonia-nitrogen values. All the treated solutions remained at about pH 1.2.

Significant removal of acetic acid, measured as COD, was found in tests 2 and 3. In these tests no oxygen was available, yet significant amounts of the acetic acid were destroyed. The ammonium nitrate decomposition provided an oxygen source which in turn oxidized the acetic acid. The decomposition of ammonium nitrate likely occured via the reaction:

$$2NH_4NO_3 \rightarrow 4H_2O + 2N_2 + O_2$$

TABLE 1

| ACETIC ACID/AMMONIUM NITRATE DECOMPOSITION AT TEMP. FOR 1 HOUR | | | | |
|---|---|---|---|---|
| Test No. | FEED | 1 | 2 | 3 |
| Temp., °C. | — | 260 | 280 | 300 |
| NO₃—N, mg/l | 875 | 860 | 690 | 117 |
| NH₃—N, mg/l | 875 | 860 | 695 | 119 |
| TKN, mg/l | 875 | 820 | 665 | 134 |
| COD, mg/l | 1091 | 1029 | 850 | 246 |
| % N as N₂ | — | 2.3 | 15.3 | 67.0 |

EXAMPLE II

A simulated wet oxidation effluent stream with acetic acid and equal concentrations of ammonia-nitrogen and nitrate-nitrogen was prepared containing 9640 mg/l acetic acid, and 53,300 mg/l of ammonium nitrate resulting in 9330 mg/l each of ammonia-nitrogen and nitrate-nitrogen. The solution had a pH 3.0.

A sample of the solution was placed in an autoclave and pressurized with sufficient air to provide the oxygen necessary for complete oxidation of the acetic acid present. The autoclave was heated at 280° C. for 1 hour, then it was cooled and the gas and liquid phases analyzed with the results shown as test 4 in Table 2. In an identical run 500 mg/l of copper, in the form of soluble copper sulfate, was added to the feed solution and this solution was treated in the autoclave under the conditions described above. The analytical results are shown as test 5 in the Table 2. Tests 6 and 7 were performed under the conditions described above except helium was used to pressurize the autoclave instead of air, allowing analysis of the gas phase for elemental nitrogen gas. No copper was present in the solution of test 6 while the test 7 solution contained 500 mg/l copper.

Tests 4 and 6 showed little change in liquid phase ammonia-nitrogen and nitrate-nitrogen concentrations. Total Kjeldahl Nitrogen (TKN) measures ammonia-nitrogen but not nitrate-nitrogen. Tests 5 and 7, with copper present, showed significant reductions in these liquid phase parameters. With helium used to pressurize the autoclave, over 77% of the total nitrogen in the liquid phase was converted to elemental nitrogen gas in test 7, as determined by analysis of the gas phase. Only about 8% conversion of the total nitrogen in solution to nitrogen gas was observed without copper present in test 6. All the treated solutions remained at about pH 3.0.

Similarly, the acetic acid content of the solutions changed little without copper present in test 4 and 6. However, significant removal of acetic acid was found in tests 5 and 7 with copper present. Test 5 contained air which provided oxygen to oxidize most of the acetic acid present. In test 7, no oxygen was available, yet most of the acetic acid was destroyed. The ammonium nitrate decomposition provided an oxygen source which in turn oxidized the acetic acid with the assistance of the copper catalyst. The decomposition of ammonium nitrate likely occured via the reaction:

$$2NH_4NO_3 \rightarrow 4H_2O + 2N_2 + O_2$$

TABLE 2

| ACETIC ACID/AMMONIUM NITRATE DECOMPOSITION AT 280° C. FOR 1 HOUR | | | | | |
|---|---|---|---|---|---|
| Test No. | Feed | 4 | 5 | 6 | 7 |
| $NO_3$—N, mg/l | 9330 | 8910 | 5360 | 8545 | 1650 |
| $NH_3$—N, mg/l | 9330 | 8989 | 5034 | 8630 | 1746 |
| TKN, mg/l | 9330 | 8514 | 4405 | 7524 | 2425 |
| $Cu^{+2}$, mg/l | 0 | 0 | 500 | 0 | 500 |
| $CH_3CO_2H$, mg/l | 9640 | 9662 | 1171 | 8985 | 1405 |
| % N as $N_2$ | 0 | — | — | 8.20 | 77.25 |

While the invention has been particularly shown and described with reference to a preferred embodiment thereof, it will be understood by those skilled in the art that various changes in form and details may be made therein without departing from the spirit and scope of the invention.

We claim:

1. A process for treating wastewaters containing carbonaceous COD and at least one nitrogen-containing compound comprising the steps:

(a) wet oxidizing said wastewater with an oxidizing agent at a temperature less than 373° C. and a pressure sufficient to maintain a liquid water phase, to produce an oxidized wastewater containing a reduced concentration of COD and a pH less than 4, wherein nitrogen of said nitrogen-containing compound is substantially converted to one or more of the species selected from the group ammonia and nitrate;

(b) adding sufficient inorganic nitrogen-containing compound to said oxidized wastewater to produce essentially equal concentrations of ammonia-nitrogen and nitrate-nitrogen;

(c) heating said wastewater of pH less than 4 at temperatures between about 100° C. and 300° C. to decompose the nitrogen compounds therein essentially to nitrogen gas and water, thereby producing a purified wastewater.

2. A process according to claim 1 further comprising adding an effective amount of a soluble transition metal salt to said acidic oxidized wastewater of step (c) to further catalyze said thermal denitrification at temperatures between about 100° C. and 300° C.

3. A process according to claim 2 wherein said soluble transition metal catalyst is the salt of a metal selected from the group V, Cr, Mn, Fe, Co, Ni, Cu, Zn, and Mo.

4. A process according to claim 2 wherein said soluble transition metal catalyst is added to said oxidized wastewater at a concentration of about 10 to 2,000 mg/l.

5. A process according to claim 2 further comprising removing said soluble transition metal catalyst from said purified wastewater by a process selected from the group chemical precipitation, ion exchange and selective membrane filtration.

6. A process according to claim 1 wherein steps (a), (b) and (c) are carried out in a single wet oxidation reaction zone without intermediate cooling between step (a) and steps (b) and (c).

7. A process according to claim 1 wherein said oxidizing agent is an oxygen-containing gas selected from the group air, oxygen-enriched air and essentially pure oxygen.

8. A process according to claim 1 wherein said oxidizing agent is selected from the group hydrogen peroxide and ozone.

9. A process according to claim 1 wherein said wet oxidation temperature is preferably between about 150° C. and 325° C.

10. A process according to claim 1 wherein said inorganic nitrogen-containing compound used for adding ammonia nitrogen is selected from the group ammonium sulfate, ammonium phosphate and ammonium hydroxide.

11. A process according to claim 1 wherein said inorganic nitrogen-containing compound used for adding nitrate-nitrogen is an alkaline or alkaline earth nitrate.

12. A process according to claim 1 wherein step (a) and steps (b) and (c) are carried out in separate reaction zones.

13. A process according to claim 12 wherein said oxidized wastewater of step (a) is cooled prior to said denitrification treatment of steps (b) and (c).

14. A process according to claim 12 wherein said oxidized wastewater of step (a) is not cooled prior to said denitrification treatment of steps (b) and (c).

* * * * *